Aug. 11, 1970     R. BISHOP     3,523,698

LEVELLING SYSTEM FOR TRAILERS AND THE LIKE

Filed Oct. 3, 1968     2 Sheets-Sheet 1

INVENTOR:
RALPH BISHOP
BY:
*B. DeonGriddle*
ATTORNEY

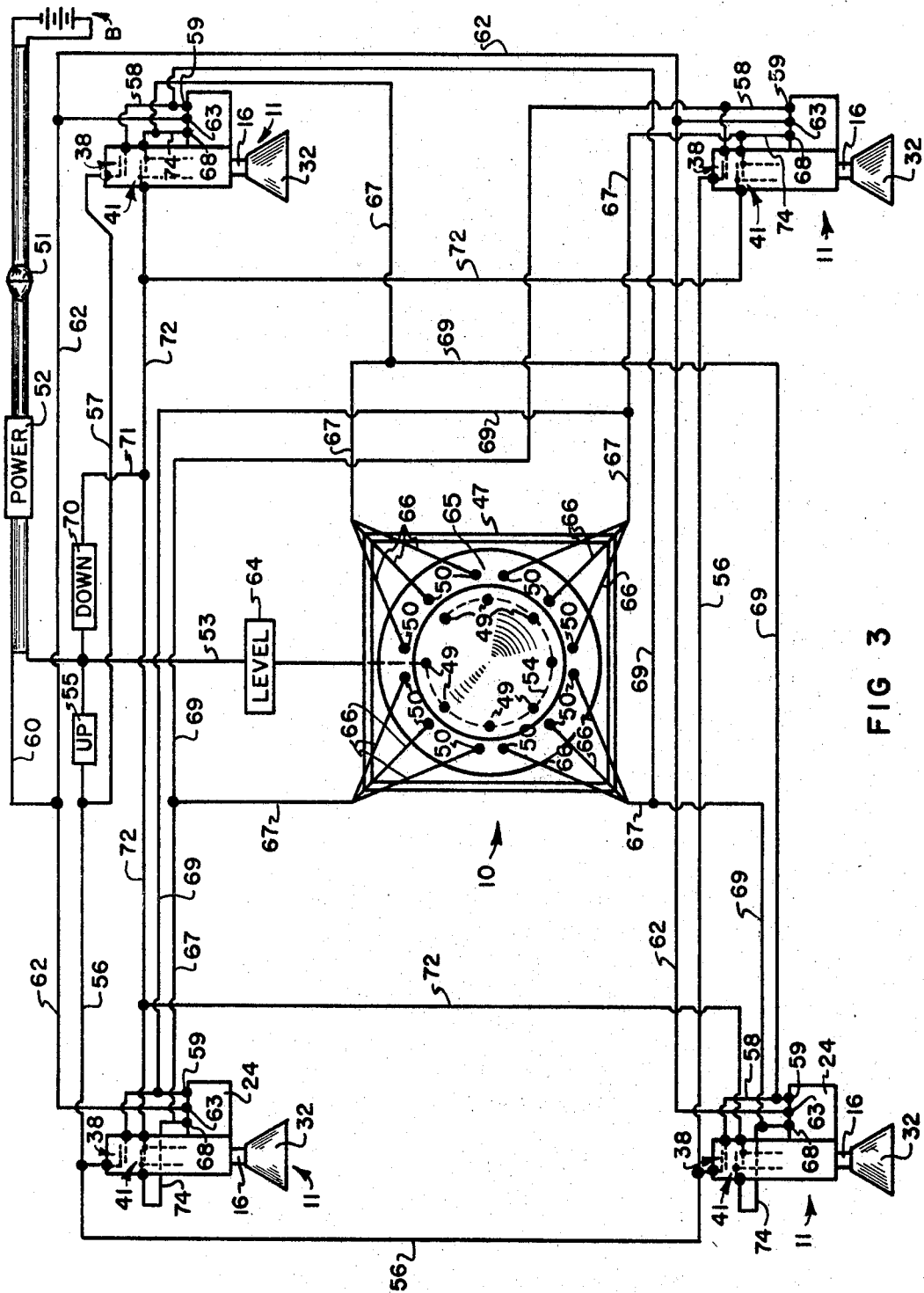

United States Patent Office 3,523,698
Patented Aug. 11, 1970

3,523,698
LEVELLING SYSTEM FOR TRAILERS
AND THE LIKE
Ralph Bishop, 9521 South 3365 East Granite,
Sandy, Utah 84070
Filed Oct. 3, 1968, Ser. No. 764,872
Int. Cl. B60s 9/08
U.S. Cl. 280—150.5                           7 Claims

ABSTRACT OF THE DISCLOSURE

A system wherein support legs of levelling jacks are lowered to be in ground contacts, are operated to automatically level the load on the legs, and are electrically retracted. The motors to the levelling jacks are automatically stopped when the legs are in ground contacts, when the load has been levelled and when the legs are retracted beneath the load.

BRIEF DESCRIPTION

Figure 1:
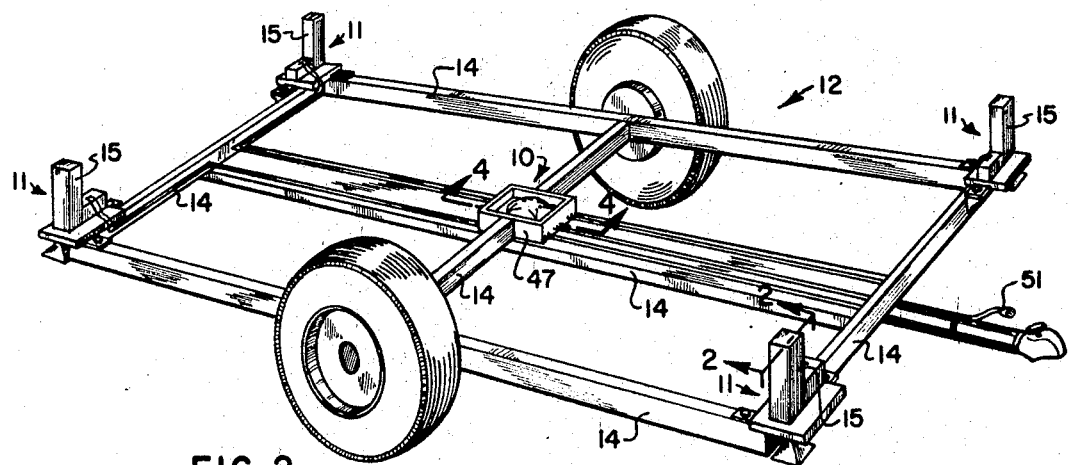

In using travel trailers it is desirable that they be more or less level each time they are used. This is because the water system, refrigerator, and stoves therein are generally designed to function best when the trailer is level and because if the trailer is not level the personal comfort of the users, who must walk, sit and sleep in the trailer, is reduced.

Some jack systems have been used in the past to level trailers, but in these system the jacks have been widely separated and either several operators have been required for them or a single operator must move from jack to jack to individually operate them. While operating these conventional jacks it is also necessary to constantly check on whether or not a level relationship has been obtained. This is usually done inaccurately by approximation, or more accurately using a spirit level. In any event, proper levelling has heretofore been difficult and time consuming to obtain. As a result many trailer users merely attempt to find a reasonably level parking spot and either dig a hole or build up a spot where a trailer wheel is to rest. If the trailer is then not level the discomfort engendered as a result is merely accepted.

While the present invention is particularly adapted for use on travel trailers, i.e. small type house trailers that are frequently moved from location to location, it should be apparent that it can also be used on other more permanent house trailers, on camper bodies that can then be levelled with respect to a truck body on which they are supported, or on any other structure that is desirably levelled and that can utilize jacks having adjustable legs. The invention is useful not only to level camper bodies but also to lift them above the truck bed while support legs are lowered or raised and the truck is moved out from beneath the camper body or is driven thereunder. It thus becomes a component of an easily and quickly operated loading and unloading system.

Principal objects of the invention are to provide a levelling system that is easily operated, that provides a signal indicative of which of the jacks having levelling legs is or are to be operated, and the direction of leg operation, and to automatically operate the jacks such that complete and accurate levelling is easily obtained.

Principal features of the invention include a level control unit with a level indicator having a conductive liquid body, a plurality of contacts arranged to provide signals indicative of the position of the unit housing relative to the liquid body, and a plurality of contacts arranged to provide signals indicative of the position of the liquid body with respect to a semi-spherical center member; and means for driving jacks of the levelling system to expel or retract legs in accordance with the signal produced through the contacts when the conductive body and housings are such that a circuit is completed through the contacts.

Other features include means for automatically lowering all of the legs into ground engagement and for stopping downward movement of each leg individually as it comes in contact with the ground; and means for simultaneously retracting all legs, with a drive motor of each leg being individually stopped as that leg reaches its fully retracted position.

Additional objects and features will become apparent from the following detailed description and drawings, disclosing what is presently contemplated as being the best mode of the invention.

THE DRAWINGS

Figure 2:
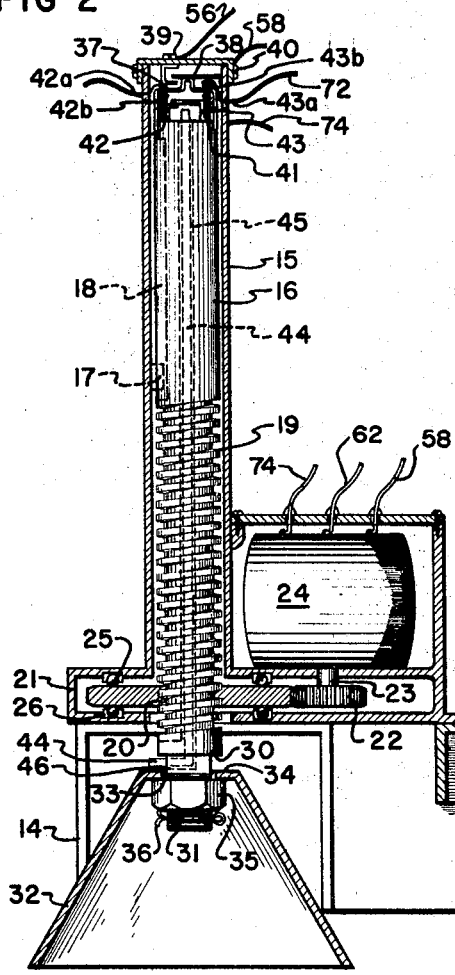

FIG. 1 is a perspective view of a travel trailer chassis, with the levelling system of the invention mounted thereon;

FIG. 2, an enlarged view, taken on the line 2—2 of FIG. 1, and showing in vertical section a typical jack of the invention including an extensible and retractable leg and electric drive means therefor;

FIG. 3, a schematic circuit diagram of the invention; and

Figure 4:
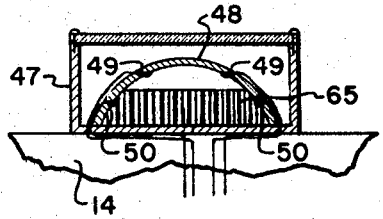

FIG. 4, an enlarged vertical section, taken on the line 4—4 of FIG. 1 and showing the level control unit of the system.

DETAILED DESCRIPTION

Referring now to the drawings:

In the illustrated preferred embodiment, the invention includes a level control unit 10, positioned in the center of the apparatus to be levelled; a plurality of jacks 11 are positioned such that their legs will serve as legs for the apparatus and are electrically interconnected such that signals indicative of the state of the level control unit are supplied to the jacks to regulate expulsion or retraction of each jack leg.

In FIG. 1, the level control unit is shown positioned at the center of a chassis 12, of a travel trailer, the body of which is not shown. Also in FIG. 1, four jacks 11 are shown, with one being positioned at each corner of the chassis and with each of them secured by bolts 13, FIG. 2, to the channel members 14, making up the chassis frame.

Each jack includes an upright, elongate housing 15, that reciprocably receives a leg 16, FIG. 2. A key 17, inside housing 15 fits into a keyway 18 on the leg to prevent rotation of the leg while allowing it to reciprocate. The exterior of leg 16 is provided with a worm thread 19 that meshes with a ring 20 on the inside of a gear 21. Gear 21 surrounds the leg 16 and its peripheral teeth mesh with the teeth of a gear 22 on the shaft 23 of a reversible electric motor 24. Bearings 25 and 26, mounted in the jack housing 27, above and below the gear 21, respectively, allow the gear to freely rotate while holding it against vertical movement.

A shoulder 30 is formed adjacent to the lower end of leg 16, a spaced distance above threads 31 that are formed on the lowermost end of the leg. A foot 32, flared outwardly to a large base, has a hole 33 through its truncated top 34 so that it will fit loosely over the lowermost end of the leg. The hole only large enough, however, that the leg can slide downwardly through the foot only until the shoulder 30 comes to rest on the foot. A nut 35, threaded onto the lower end of leg 16 retains the foot in place and a cotter pin 36, inserted through a hole provided therefore holds the nut against its inadvertently coming off the leg.

A bracket 37 is fixed to the top of leg 16 and is positioned such that when the leg is fully retracted it will contact a normally closed switch 38 positioned in the top of the housing 15 and will break the circuit therethrough, all as will be more fully described. Contacts 39 and 40, extending through the housing 15 provide means whereby the circuit is connected to the switch 38.

Another normally closed switch 41, having contacts 42 and 43 is fixed to the top of leg 16 and is movable therewith. The contacts 42 and 43 are continuously electrically connected to contacts 42a and 43a that extend through housing 15. While coiled wires 42b and 43b are shown as providing the connection between contacts 42, 43 and 42a, 43a, respectively, other sliding connections could as well be used. Switch 41 is positioned to be contacted and operated by a rod 44.

Rod 44 extends upwardly through a shaft 45 inside the leg 16 and in its lowermost position rests on a wall 46 formed by a transverse opening below shoulder 30. The rod is turned at its lower end to extend out of the transverse opening such that it will be contacted and raised by the foot 32. As the rod is raised it contacts switch 41, to open it.

Each jack 11 is bolted to the channel members at the corners of the chassis, by bolts 13 and nuts provided therefore and, through proper manipulation of the jacks, the chassis can be easily levelled.

The level control unit 10 regulates operation of the jacks to expel or retract the legs as required to level the chassis. The unit includes a housing 47, FIG. 4, having an electrically non-conductive, semi-spherical member 48 therein. A plurality of first contacts 49, shown in FIG. 3 as eight contacts, are evenly spaced circularly, around the semi-spherical member and a plurality of second contacts 50 shown in FIG. 3 as twelve contacts, in four groups of three are arranged to be spaced in a larger circle around the semi-spherical member, below and outwardly of the first contacts. Each of the groups of contacts 50 corresponds with and is positioned on the side of the semi-spherical member corresponding to one of the legs 16. The center one of each of the groups of second contacts is adjacent to one of the first contacts and the outer contacts of the group of second contacts are adjacent to the first contacts at opposite sides of the said one first contact.

The operation of the invention is best explained with reference to the schematic circuit diagram of FIG. 3. As shown, one terminal of a battery B, which may be the battery of the tow vehicle (not shown), is connected through connector plug 51, a POWER switch 52 and line 53 to the smaller circle of first contacts 49, all of which are electrically interconnected by a line 54. It should be apparent that a single circular contact could be used to replace the interconnected contacts 49, and although the member 48 is preferably semi-spherical to insure an even mercury disposition, it could, if desired, be of other configurations.

Through an UP switch 55 and lines 56 and 57 the line 53 is also connected to one contact of each normally closed switch 38, and through lines 58 the other contacts of the switches 38 are connected to the terminals 59 of motors 24, which terminals are included within the circuits for driving the motors to drive gears 21, FIG. 2, such that the legs 16 are retracted. The other terminal of battery B is connected through connector plug 51 and lines 60 and 62 to the A terminal 63 of each motor that completes the circuit for driving the motor to retract its associated leg 16.

Thus, whenever connector plug 51 is connected and POWER switch 52 and UP switch 55 are closed, motors 24 will be driven and legs 16 will be retracted. When fully retracted the brackets 37, FIG. 2, on top of the legs 16 will open switches 38 and the motors will stop.

If, after the legs have been lowered to the ground, the LEVEL switch 64 in line 53 is closed, potential circuits through the contacts 49 and any of the contacts 50 will be set up. If the chassis 12 on which the level control unit 10 is mounted is level, a body of mercury 65 inside member 48 will be positioned below any of the contacts 49 and will not complete any one or more of the potential circuits. If, however, the chassis is not level, the level mercury will complete a circuit between the contacts 49 and one or more of the lowermost contacts 50 of one or more of the groups of second contacts.

Each group of contacts 50 is connected through lines 66 and 67 to a terminal 68 of a correspondingly positioned motor 24 and, through the line 67 and the line 69 with the terminal 59 of the motor 24 of the diagonally opposite jack. Thus, movement of the contacts to position them such that the mercury provides an electrical connection between a contact 49 and a contact 50 completes a circuit from line 53 through the contacts 59 and 50, one ore or more lines 66, a line 67, terminals 68 and 63 of the motor 24 associated with that contact 50, and lines 69, 62 and line 60 to drive the motor such that its associated leg 16 is expelled. At the same time the motor diagonally across therefrom is operated to retract its associated leg 16, through a circuit comprising line 53, the contacts 49 and 50 that are closed by the mercury 65, lines 66, 67 and 69, terminals 59 and 63 of that motor, and 62 and 60. As the level unit tips in response to the changing lengths of the opposed legs the contacts move until contact 47 are all out of engagement with the mercury, the circuits to the motors are broken, and the chassis is level.

While it is preferable that two diagonally opposite legs simultaneously move in opposite directions, it should be apparent that levelling could also be performed by merely extending one leg, while immobilizing the one diagonally opposite thereto.

To place all legs in initial contact with the ground, so that the levelling unit can best be utilized to level the chassis, it is only necessary to close the POWER switch 52 and a DOWN switch 70 in a line 71 that is connected to line 53, and lines 72 to one contact of switch 41, through the normally closed switch, lines 74, terminals 68 and 63 of the motors 24 and lines 62 to drive the motors such that the legs 16 are expelled. When the foot 32 of each jack hits the ground, its associated leg will continue its downward movement until pin 44 contacts the foot and is held against further downward movement with the leg. The leg continues to move downwardly until the switch 41, carried thereby, is opened by the protruding pin 44, at which time the circuit is broken and the motor is stopped. The foot 32 is then on the ground and the leg rests on the foot and supports the chassis.

In operation, assuming the legs have been retracted and it is desired to set up the travel trailer, the user will uncouple the trailer from the towing vehicle while leaving the power connector plug attached.

He will then actuate POWER switch 52 and DOWN switch 70 to simultaneously move all legs into ground engaging condition. After all legs are in ground contact and their motors 24 have stopped, the LEVEL switch 64 is actuated. This automatically levels the unit with diagonally opposite legs being driven in opposite directions until all circuits through the level control unit are broken. The trailer is ready for use and the POWER, DOWN, and LEVEL switches can all be returned to their "off" positions and the power connector plug 51 can be disconnected.

When it is desired to prepare the trailer for movement, the power connector plug is again connected, the POWER switch and the UP switch are actuated and the legs are retracted as heretofore described, with the motors 24 being automatically stopped when their associated legs reach the fully retracted position. Thereafter the POWER switch and the UP switch can be returned to their normal open positions and the trailer is ready to be moved.

In some instances it may be necessary to positively prohibit reverse rotation of gears 21 after the legs have been expelled. This can be easily accomplished by mounting a solenoid controlled brake (not shown) on the housing surrounding each gear such that the brake will act on the gear. The brake will then normally hold the gear against rotation, but will be energized to release the gear whenever a circuit is completed through the DOWN switch 70, UP switch 55, or level control unit 10.

While the invention has been herein disclosed as being especially useful for trailers, it should be understood that it can as well be used on other equipment that desirably is quickly and easily levelled. Also, while the invention has been shown as being used to control four legs and a specific number of contacts have been provided in the level control unit, more or fewer legs can be controlled and the contact arrangement in the level control unit can be varied.

The level control unit also finds great utility in systems employing manual jacks. In this instance an indicator, such as a light (not shown), at each jack will be operated upon completion of a circuit through the level control unit. An operator will then operate the jacks, as indicated by the lights, until a level relationship is obtained.

Although a preferred form of my invention has been herein disclosed, it is to be understood that the present disclosure is made by way of example and that variations are possible without departing from the subject matter coming within the scope of the following claims, which subject matter I regard as my invention.

I claim:
1. A levelling system for trailers and the like comprising
   a plurality of reversible jacks, having extensible and retractable legs;
   means for simultaneously extending said legs to place them in ground engaging position;
   means for individually stopping said legs as they come into ground engagement;
   means for thereafter automatically driving said legs to level the load thereon;
   means for simultaneously retracting the legs; and
   means for individually stopping movement of said legs as they reach their fully retracted positions.

2. A levelling system according to claim 1, wherein the means for automatically driving the legs to level the load thereon simultaneously drives opposing legs to raise one and to lower the other.

3. A levelling system according to claim 1, wherein the reversible jacks each comprise
   an elongate housing;
   an elongate leg adapted to telescope into and out of said housing; and having a worm thread on the exterior thereof;
   a gear surrounding said leg and having an interior member extending into said worm thread;
   means journaling said gear for rotation, and holding it against travel axially of said leg;
   and wherein the means for simultaneously extending the legs and the means for simultaneously retracting the legs comprises
      a reversible motor;
      a drive gear meshing with the periphery of the gear surrounding the leg and driven by the motor, whereby the motor drives the drive gear, which drives the gear around the leg to expel or retract the said leg with respect to the said housing.

4. A levelling system according to claim 3, wherein the motor is electrically powered.

5. A levelling system according to claim 3, wherein the means for individually stopping said legs as they come into ground contact comprises
   a switch carried by each leg;
   a foot extending beneath each leg and slidable on a lower portion thereof between a retaining means on the lower end of the leg and a shoulder thereabove;
   a pin extending slidably through each leg and arranged to rest on the foot and to be moved by the foot with respect to the housing to open the switch carried by the leg when the shoulder rests on the foot.

6. A levelling system according to claim 3, wherein the means for individually stopping movement of the legs as they reach their fully retracted positions comprises
   a switch carried by each elongate housing; and
   means carried by each leg adapted to engage and open the switch carried by the housing for the leg when the leg is fully retracted.

7. A levelling system according to claim 3, wherein the means for automatically driving said legs to level the load thereon includes a level control unit, positioned to be tilted with the load on the jacks, said unit including a housing, a body of mercury within the housing, lower spaced electrical contacts within the housing at a level below the surface of the body of mercury when the housing is level, and an upper spaced electrical contact ring within the housing at a level just above the surface of the body of mercury when the housing is level, and means electrically connecting the lower and upper contacts into the drive circuits for the means for driving the legs.

References Cited

UNITED STATES PATENTS

| 3,164,275 | 1/1965 | Schatzl | 214—515 |
| 3,437,377 | 4/1969 | Lautsch | 280—6.1 |
| 3,442,531 | 5/1969 | Rutledge | 280—150.5 |

BENJAMIN HERSH, Primary Examiner

L. J. PAPERNER, Assistant Examiner

U.S. Cl. X.R.
254—45, 86